June 14, 1949.  A. F. SCHWENDNER  2,472,924
ELECTRIC DRIVE FOR GAS TURBINE LOCOMOTIVES
Filed Jan. 12, 1946
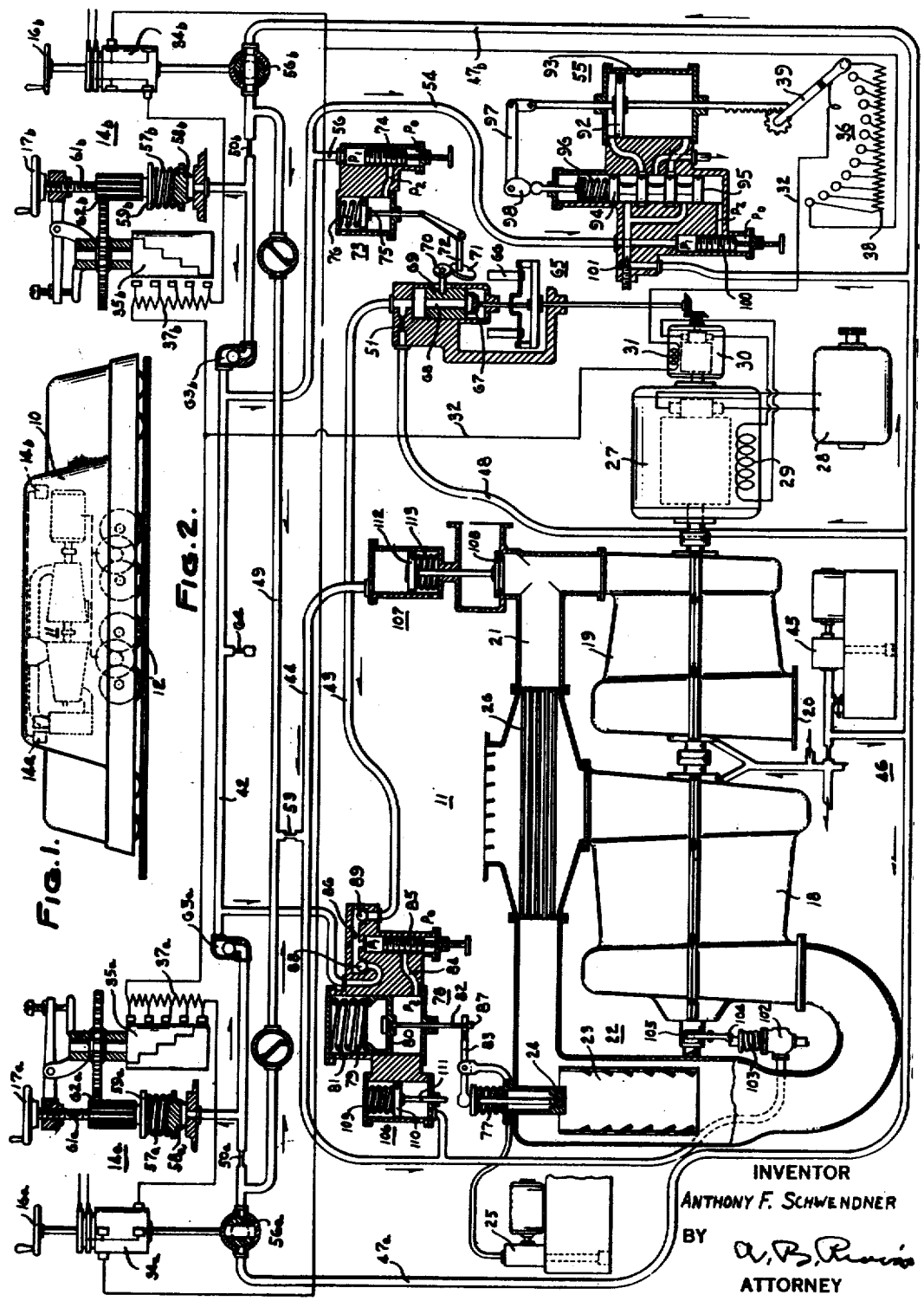
INVENTOR
ANTHONY F. SCHWENDNER
BY
ATTORNEY Patented June 14, 1949

2,472,924

UNITED STATES PATENT OFFICE 2,472,924

ELECTRIC DRIVE FOR GAS TURBINE LOCOMOTIVES

Anthony F. Schwendner, Ridley Park, Pa., assignor to Westinghouse Electric Corporation, East Pittsburgh, Pa., a corporation of Pennsylvania Application January 12, 1946, Serial No. 640,837

10 Claims. (Cl. 290—2)

The invention relates to a gas turbine plant connected by an electric drive to propelling means, such as the traction wheels of a locomotive, and it has for an object to provide an improved electro-mechanical system for controlling the input of fuel to the plant and the voltage of the generator of the electric drive.

With a locomotive, or the like, employing a gas turbine plant connected to the traction wheels by an electric drive and in which the plant includes an axial-flow compressor, efficient operation is restricted to a narrow speed range for any fuel input value. If the speed is too low, stalling of the compressor occurs; on the other hand, if the speed is too high, the compressor efficiency drops off precipitously. As the compressor, turbine and generator rotors are connected to rotate together, it is desirable to correlate the fuel input and voltage of the generator so that, as the plant is operated over its power range, it operates at the optimum speed for any power, but, as the turbine and generator rotate at the same speed, it is necessary to vary the generator excitation to match the generator load with the plant operating at the optimum speed. Accordingly, a further object of the invention is to provide a controlling system which is adjustable manually to change both the fuel input and the generator excitation so that, for the plant power output at the optimum speed, the generator operating at the same speed provides a load matching such output.

A further object of the invention is to provide a controlling system of the above character wherein, when the fuel input is increased for increase in propulsion speed, the generator excitation is increased at a lesser rate to provide power for accelerating the turbine and compressor to hasten the increase in the quantity of air required for the increased fuel input to minimize the rise in temperature of gaseous motive fluid supplied to the turbine.

Increase in load of a gas turbine requires increase in fuel input, but increase in the fuel rate requires increase in the air supply rate in order that the mixture of combustion products and air may be delivered as motive fluid of the desired temperature to the turbine. Change in the compressor air delivery rate requires time; and, to avoid undue rise in motive fluid temperature upon increase in fuel input, it is desirable to retard the increase in generator load so that the increase in fuel input may result in acceleration of the turbine and the compressor to increase the air supply as rapidly as possible. In accordance with the present invention, both the fuel input and the generator excitation are subject to manual control, but the controlling effect on the generator excitation is delayed to provide a transient phase of increase in air supply relative to load, that is, the increase in turbine torque incident to increase in fuel input is accompanied by increase in generator torque at a lesser rate, with the result that the turbine torque is effective to accelerate the compressor to increase the air supply with sufficient rapidity to avoid excessive motive fluid temperatures, the generator torque increasing gradually due to increase in excitation to increase the propulsion speed. To make possible such a correlated control of fuel input and generator excitation, I provide a controlling liquid pressure which may be raised and lowered by manual adjustment together with a pressure-responsive device and a servo-motor for operating a fuel valve and a generator rheostat respectively, the pressure-responsive device and the servo-motor each being individually adjustable so as to operate through its range for a given range of controlling liquid pressure change and the rheostat servomotor also being adjustable to provide for the desired retarded action. In addition to manual control, the fuel valve pressure-responsive device is also subject to influence of a governor to limit the turbine speed. Preferably, the controlling liquid pressure is increased for decrease in load and vice versa, and, to provide for the desired range from a high pressure for zero load or idling to a low pressure for full load, there is provided a cup relief valve loaded by a spring whose loading or setting may be adjusted manually. The governor operates a cup valve arranged to provide a governor pressure which increases in response to increase in speed incident to decrease in load and vice versa. The fuel valve pressure-responsive means is acted upon by the control pressure or the governor pressure, whichever is the higher. The governor is equipped with means operated by the controlling liquid pressure for varying its speed setting so that, with the governor set for a speed somewhat higher than that corresponding to a given fuel input, overspeeding is avoided. As the propulsion speed is varied, the governor pressure rises and falls with the control pressure but is kept below the latter just to such an extent that, at any point over the operating range, the governor is available to limit the speed, the governor pressure superseding the control pressure and moving the fuel valve in a closing direction in the event of sufficient increase in speed. To protect the plant against excessive overspeeds, there is provided an emergency governor system which operates to cut off the supply of fuel and to vent the compressor to atmosphere, and the emergency governor system includes closers for the fuel valve and for the compressor vent valve together with means providing a space supplied with liquid from the main hydraulic system and normally effective to provide pressure which keeps the fuel valve closer in ineffective position and operates the vent valve closer to keep the vent valve closed. The emergency governor space also has a valve which is normally closed but which is tripped open by operation of the emergency governor, opening of such valve resulting in sudden decline in pressure applied to the closers with the result that the spring of the fuel valve closer is effective to operate the latter to close the fuel valve and the spring of the vent valve closer is effective to open the vent valve.

More particularly, with the gas turbine plant aforesaid arranged to transmit power to the traction wheels of a locomotive by means of an electric drive, there is provided a control system having a control station at each end of the locomotive. The control system is comprised by electrical and hydraulic components. The electrical component includes a generator excitation circuit, a reversing switch and a controller for each control station, and a rheostat. With one of the reversing switches closed for forward or reverse propulsion, the corresponding controller and the rheostat are operative to insert resistance in and remove such resistance from the excitation circuit, the inserted resistance of the controller and of the rheostat being arranged in series in the excitation circuit. The hydraulic component comprises a pump, a high-pressure conduit system to which liquid, preferably oil, is delivered by the pump, a control pressure space, a pair of orifices for supplying liquid from the high-pressure conduit system to the control pressure space, valves for cutting off or permitting the flow of liquid through the orifices from the conduit system, a pair of control pressure space spring-loaded relief or escape valves, one for each control station, a governor pressure space supplied through an orifice from the high-pressure system, and an emergency governor pressure space supplied from the high-pressure system through an orifice. The fuel valve is operated by means responsive to the control pressure or the governor control pressure, whichever is the higher, and the control pressure acts on pressure-responsive means for adjusting the governor speed changer and on a pressure-reponsive relay of a servo-motor for operating the rheostat. The control stations each include first and second manual operators, the first operators being connected to the respective reversing switches and cut-off valves and the second operators being connected to the respective controllers and to means for varying the loading of the springs of the control pressure space escape or relief valves. The hydraulic component also includes means providing an emergency pressure space supplied with oil from the high-pressure conduit system between the cut-off valves and the orifices by an orifice together with closing devices for the fuel control valve and for a compressor atmospheric relief valve, the closing devices being responsive to the pressure normally existing in the space so that the one for the fuel control valve is maintained in ineffective position and the one for the compressor atmospheric vent valve keeps the latter closed, and, upon sudden or emergency decline in pressure in said space occasioned by overspeeding of the turbine to a predetermined extent, the devices are operated to close the fuel control valve and to open the compressor atmospheric vent valve. Due to ratio-changing devices associated with the pressure-responsive means for operating the fuel control valve and the governor speed-changing mechanism and for operating the relay of the rheostat servo-motor, adjustments may be made so that, for the control pressure load range, the fuel control valve, the governor speed changer, and the rheostat may be operated through their ranges in the desired relation.

Accordingly, with a gas turbine connected to propulsion means by an electric drive, a further object of the invention is to provide a controlling liquid pressure raised and lowered to vary the input of fuel to the turbine and the excitation of the generator of the electric drive.

Another object of the invention is to provide, with a controlling liquid pressure of the above character and for the above purpose, a pressure-responsive device for the fuel valve and a servo-motor for the generator rheostat, the pressure-responsive device and the servo-motor operating in response to controlling liquid pressure and being individually adjustable for operating ranges for a given range of controlling pressure change.

A further object of the invention is to provide a manually-controlled liquid pressure of the above character normally effective to control the turbine speed together with a governor liquid pressure which supersedes the control pressure and limits the turbine speed.

A further object of the invention is to provide, with a gas turbine connected to propulsion means by an electric drive, a high-pressure system for supplying oil to a controlling liquid pressure space and to an emergency governor liquid pressure space, the controlling liquid pressure being used to adjust the fuel input and the generator excitation and the emergency governor liquid pressure being normally effective to maintain a fuel valve closer in ineffective position and to maintain a closer for a compressor vent valve in position with the vent valve closed, together with an emergency governor which trips in response to overspeeding of the turbine to a predetermined extent to reduce suddenly the pressure in the emergency governor space with the result that the closer for the fuel valve is rendered effective to close the fuel valve and the closer for the vent valve is rendered effective to open the latter.

These and other objects are effected by the invention as will be apparent from the following description and claims taken in connection with the accompanying drawings, forming a part of this application, in which:

Fig. 1 is a side elevational view of a locomotive having the improved propulsion power plant applied thereto; and Fig. 2 is a diagrammatic view showing the power plant with the improved controlling system applied thereto.

With a locomotive incorporating a gas turbine connected by an electric drive to the traction wheels, the present invention contemplates a controlling liquid pressure for positioning the fuel valve, for adjusting the governor speed changer, and for adjusting the rheostat controlling the generator field excitation. The fuel input or admission valve is opened and closed by means operating in response to controlling liquid pressure, an increase in controlling liquid pressure being effective to move the fuel valve in a closing direction and vice versa, the pressure-responsive means including a proportioning or ratio-changing device so that, for the load range of controlling liquid pressure, the pressure-responsive means may move the fuel valve through its full range. The generator rheostat is operated by means of a servo-motor subject to the controlling liquid pressure, the latter servo-motor also including a proportioning or ratio-changing device by means of which the generator load may be correlated to the fuel input. In addition, the rheostat servo-motor includes means by which its action may be delayed in relation to that of the admission valve servo-motor. A governor is provided to limit the turbine speed, the governor functioning in an auxiliary or protective capacity and being provided with means responsive to the controlling liquid pressure to adjust its speed setting so that it operates to maintain a governor pressure which is kept normally below the control pressure so that the latter normally controls the fuel valve but which governor pressure increases above the control pressure due to increase in turbine speed to move the fuel valve in a closing direction to limit the speed. Because of the delay feature forming a part of the rheostat servo-motor, lag is introduced in the operation of the rheostat so that, with increase in fuel input, the generator excitation does not immediately increase to the extent corresponding to the increase in fuel input but it is delayed or retarded so that the increase in turbine torque or power in relation to generator load is effective temporarily to provide for acceleration of the turbine and compressor to hasten the increase in the quantity of air required for the increased fuel input to avoid excessive rise in temperature of the motive fluid, consisting of products of combustion and air, delivered to the turbine, to protect the turbine against injury or burning out.

In Fig. 1, there is shown a locomotive 10 incorporating a gas turbine power plant, at 11, connected by an electric drive to the traction wheels 12. The plant and the electric drive are under control of a system including hydraulic and electrical components. The system has similar control stations, at 14a and at 14b, at opposite ends of the locomotive, the control stations including first manual operators 16a and 16b and second manual operators 17a and 17b.

The gas turbine plant, at 11, includes a turbine 18 driving an axial-flow or turbine compressor 19 having an inlet 20 open to the atmosphere and a discharge conduit 21 for supplying compressed air to the gas generator, at 22. The gas generator includes a burner 23 to which liquid fuel is supplied from the motor-operated fuel pump 25 through the fuel control valve 24. The gas generator delivers gaseous motive fluid, consisting of products of combustion and air of suitable temperature and pressure, to the inlet of the turbine for operation of the latter. A heat exchanger or regenerator 26 provides for transfer of heat from the turbine exhaust to the compressed air flowing from the compressor to the motive fluid generator.

The electric drive includes a direct current generator 27 driven by the turbine and connected to one or more traction motors 28. To provide for rotation of the generator with the axial-flow compressor, and the latter rotating at the optimum speed for the power of the plant, as determined by the fuel input, the voltage of the generator is suitably varied to match the generator load with the plant power input. As shown, the generator has a field winding or windings 29 energized by an exciter 30 driven by the turbine and having a field element 31 whose excitation is controlled by the circuit 32.

The electrical component of the control system includes, in addition to said excitation circuit 32, reversing switches 34a and 34b connected, respectively, to the first controlling members or manual operators 16a and 16b and controllers 35a and 35b connected, respectively, to the second controlling members or manual operators 17a and 17b, and a rheostat, at 36. With one of the reversing switches 34a or 34b closed by operation of the corresponding manually operable control member 16a or 16b, the resistance 37a or 37b of the corresponding controller is arranged for insertion in and removal from the excitation circuit dependent upon operation of the controller. The rheostat, at 36, includes a resistance 38 which is inserted and removed from the excitation circuit by means of the movable contact arm 39, and the inserted resistance of the rheostat is in series relation with that inserted by the controller of the control station whose reversing switch is closed.

The hydraulic component includes means providing a control pressure space, a governor pressure space, and an emergency governor pressure space, such spaces being respectively defined in part by the control pressure conduit 42, the governor pressure conduit 43, and the emergency governor pressure conduit 44.

A motor operated pump 45 delivers oil to the conduit system, at 46, including the pair of branch conduits 47a and 47b, the branch conduit 48, and the conduit 49, the pair of branch conduits 47a and 47b supplying oil through the orifices 50a and 50b to the control pressure space, the branch conduit 48 supplying oil through the orifice 51 to the governor pressure space, and the conduit 49 having its ends connected to the branch conduits 47a and 47b for supplying oil through the orifice 53 to the emergency governor space. The high-pressure conduit system also has a branch conduit 54 for supplying oil to motivate the rheostat servo-motor, at 55.

The branch conduits 47a and 47b have stop valves 56a and 56b connected, respectively, to the first manually operable control members 16a and 16b to which the reversing switches 34a and 34b are also respectively connected, the arrangement being such, when either of the first manually operable control members is operated to move its stop valve to cut-off position, the associated reversing switch is interrupted; and, with the reversing switch closed, either for forward or reverse propulsion, the associated stop valve is opened. As shown in Fig. 2, the stop valve 56a is closed, incident to rendering the control station, at 14a, ineffective, and the stop valve 56b is open, incident to rendering the control station, at 14b, active.

The control pressure is varied by adjusting the compression of the springs 57a and 57b exerting closing force on the escape or relief valves 58a and 58b for the control pressure space, each relief valve having an area exposed to control pressure so that the latter exerts force on the valve, tending to open it against the force of its spring.

Variation of compression of the springs 57a and 57b is effected by means of abutments 59a and 59b carried by screws 61a and 61b and operatively connected to the second manual control members 17a and 17b, the screws being connected by gearing 62a and 62b to the controllers 35a and 35b so that rotation of either screw to vary the control pressure results in turning of the associated controller drum to vary the resistance 37a or 37b included in the excitation circuit.

The control pressure conduit 42 preferably has check valves 63a and 63b to prevent backflow therefrom towards the closed one of the cut-off valves 56a and 56b. Between the check valves 63a and 63b, the control pressure conduit 42 has a leak-off orifice 64.

A centrifugal governor, at 65, is driven from the turbine and it includes flyweights 66, whose centrifugal force exerts thrust on the cup valve 67 to move the latter in a closing direction against force exerted thereon by the governor control pressure and tending to open it, whereby the pressure in the governor pressure space, including the conduit 43, is increased with increase in speed due to decrease in load and vice versa.

The cup valve 67 is arranged in covering relation with respect to the discharge port 68 formed in the elongated member 69 movable axially of the governor rotational axis. Movement of the member 69 away from the governor requires a higher turbine speed for a given governor pressure and vice versa. The member 69 is positioned by cooperating cams 70 and 71, the cam 71 being connected to an operating shaft 72, the shaft and the cams constituting means by which the speed setting of the governor may be varied. The shaft 72 is moved by pressure-responsive means, at 73. A pressure ratio changing device 74 utilizes liquid supplied thereto under control pressure from the conduit 42 to provide pressure in desired ratio to the control pressure.

The pressure ratio changing devices herein described, for example, the device 74, embody the construction and principle of operation of Bryant Patent No. 2,323,115, granted June 29, 1943. In brief, such a device is constituted by a plug having a fine thread covered by a cylinder to define a viscous orifice which has the characteristic that the flow varies directly as the pressure drop, rather than as the square root of the pressure drop, and the pressure at any point is a function of the length of the orifice groove between such point and the high-pressure end. Therefore, assuming that the pressure in the control pressure conduit is $P_1$ and that such pressure is applied to the upper end of the plug 74 and that the lower end of the plug is open to the atmosphere, pressure $P_0$, then the pressure $P_2$ at an intermediate point depends upon the length of the groove between $P_1$ and $P_2$. Therefore, with adjustment of the plug longitudinally, while the pressure from $P_1$ to $P_0$ remains unchanged, the pressure drop from $P_1$ to $P_2$ is altered, that is, the pressure $P_2$ may be adjusted to provide any desired ratio thereof with respect to pressure $P_1$ by adjusting the plug longitudinally. Liquid at the pressure $P_2$ is applied to the piston 75 to move the latter against the force of the spring 76. By suitable adjustment of the plug 74, pressure $P_2$ may have such relation to the control pressure $P_1$ that it is effective to move the governor speed changing mechanism in proper relation with respect to the control pressure as the latter is varied over its range.

The fuel control valve 24 is moved in an opening direction by a spring 77 and pressure-responsive means, at 78, is effective to move the valve in a closing direction against the force of the spring.

The pressure-responsive means, at 78, includes a cylinder 79, a piston 80 in the cylinder, and a spring 81 exerting force on the piston to move the rod 82 downwardly to tilt the lever 83 clockwise to permit the spring 77 to move the valve 24 in an opening direction. The piston 80 is moved upwardly against the force of the spring by liquid supplied to the port 84 by the pressure ratio changing device 85, the latter utilizing pressure existing in the chamber 86 to provide pressure in the port 84 and below the piston in desired ratio with respect to chamber pressure for movement of the piston 80 upwardly to close the fuel valve 24 against the force of the spring 77, upward movement of the piston causing its rod abutment 87 to engage the lever 83 to tilt the latter counterclockwise for this purpose.

The chamber 86 of the pressure-responsive means, at 78, is connected to the control pressure conduit 42 and to the governor control pressure conduit 43 through the check valves 88 and 89, respectively, opening toward the chamber so that the pressure in the latter is that of the control pressure conduit or of the governor control pressure conduit, which ever is the higher.

The speed setting of the governor is adjusted normally to maintain a pressure in the governor control pressure conduit 43 which is lower than that in the control pressure conduit 42, with the result that the latter has full control of the fuel input so long as the turbine speed remains under the speed setting of the governor; however, with the turbine speed tending to exceed the speed setting, the governor comes into play to increase governor pressure to preponderate over the control pressure, whereupon the governor takes control to move the valve in a closing direction.

As the control pressure is reduced by manual adjustment of either valve 56a or 56b for increase in load and speed, such control pressure is varied over a range from a maximum value for zero load and speed or idling to a minimum value at full load and speed; and, to maintain the governor control pressure below the control pressure to the desired extent as the control pressure is varied, the latter is applied to the pressure-responsive means, at 73, for the speed changer of the governor so that for change of control pressure in the conduit 42 over the full load range, the pressure-responsive device, at 73, is operated to keep the governor pressure below the control pressure, the cams 71 and 70 contributing to the maintenance of the desired relation.

The control pressure also acts on the servo-motor, at 55, for moving the rheostat arm 39. The servo-motor includes a piston 92 in a cylinder 93, and a relay 94 controls the admission and exhaust of motive liquid to and from the cylinder at opposite sides of the piston. The relay has a pressure area 95 to which pressure is applied to move it against the force of the spring 96, and movement of the piston pursuant to movement of the relay operates through the follow-up lever 97 and the cam 98 to alter the force of the spring to bring such force into equilibrium with the force due to liquid pressure and applied to the piston area 95 with the relay in neutral position. The ratio changing device 100 utilizes liquid under control pressure and supplied from the conduit 42 to provide pressure acting on the relay in suitable relation to the control pressure so that, for change of the control pressure over the range from no load to full load, the operating piston 92 may be moved to move the rheostat arm over all of the contacts of the rheostat resistance 38.

The supply of motive fluid to the servo-motor is preferably restricted in an adjustable manner, as by the needle valve 101 in the supply passage 54, to retard movement of the servo-motor in relation to movement of the fuel control valve 24 so that, when the opening of the latter is increased to increase the fuel input and therefore the turbine power, the increase in generator excitation, and therefore generator load, secured by operation of the rheostat proceeds at a lesser rate with the result that the increased turbine power or torque is effective temporarily to accelerate the turbine and compressor to hasten the increase in the quantity of air required for the increased fuel input to avoid excessive temperature of gaseous motive fluid supplied to the turbine.

The emergency governor space is provided with a valve 102 opened by the spring 103 to dump the emergency pressure. A latch 104 retains the valve closed against the force of the spring. The turbine is provided with an emergency governor 105 which is responsive to a predetermined overspeed to release the latch, whereupon the valve opens to reduce suddenly the emergency pressure in the conduit 44 with the result that the closing device, at 106, is rendered effective to clos the fuel valve 24 and the device, at 107, is rendered effective to open the valve 108 to vent the compressor discharge directly to the atmosphere.

Upon sudden reduction of pressure in the conduit 44, the spring 109 acts on the piston 110 of the device, at 106, to move the rod 111 downwardly for abutment with the fuel valve 24 to close the latter against the force of the spring 77, this operation being possible for the reason that the rod may engage the lever to move the latter counterclockwise independently of the rod 82, the lever being free to move upwardly relative to the latter.

The closing device, at 107, for the vent valve includes a piston 112 acted on by emergency governor pressure to keep the atmospheric vent valve 108 closed against the force of the spring 113. Upon relief of pressure acting on the piston, the spring 113 opens the vent valve.

While the invention has been shown in but one form, it will be obvious to those skilled in the art that it is not so limited, but is susceptible of various changes and modifications without departing from the spirit thereof.

What is claimed is:

1. The combination with a gas turbine plant wherein a turbine drives a compressor, wherein fuel is supplied to a gas generator furnished with air from the compressor to support combustion of the fuel and to admix with the products of combustion to form gaseous motive fluid supplied to the turbine, and wherein the turbine drives a generator which energizes one or more motors connected to propelling means; of manually controllable apparatus for controlling the input of fuel to the gas generator and the excitation of the electric generator so that both the fuel input and the electric generator excitation are increased for increase in propulsion speed, said apparatus including means for retarding increase in excitation in relation to increase in fuel input to provide for temporary increase in turbine power in relation to electric generator load to accelerate the turbine and compressor and thereby hasten the increase in the quantity of air required for the increased fuel input to avoid excessive temperature rise of the gaseous motive fluid supplied from the gas generator to the turbine.

2. The combination with a gas turbine plant wherein a turbine drives a compressor, wherein fuel is supplied to a gas generator furnished with air from the compressor to support combustion of the fuel and to admix with the products of combustion to form gaseous motive fluid supplied to the turbine, and wherein the turbine drives a generator which energizes one or more motors connected to propelling means; of manually controllable apparatus for controlling the input of fuel to the gas generator and the excitation of the electric generator so that both the fuel input and the electric generator excitation are increased for increase in propulsion speed, said apparatus including means for retarding increase in excitation in relation to increase in fuel input to provide for temporary increase in turbine power in relation to electric generator load to accelerate the turbine and compressor and thereby hasten the increase in the quantity of air required for the increased fuel input to avoid excessive temperature rise of the gaseous motive fluid supplied from the gas generator to the turbine, a governor driven by the turbine and including a speed changer, and means operated by the controllable apparatus for adjusting the speed changer so that the governor remains effective to supersede the apparatus and restrict the fuel input to the gas generator so as to limit the turbine speed.

3. The combination with a gas turbine plant wherein a turbine drives a compressor, wherein fuel is supplied to a gas generator furnished with air from the compressor to support combustion of the fuel and to admix with the products of combustion to form gaseous motive fluid supplied to the turbine, and wherein the turbine drives a generator which energizes one or more motors connected to propelling means; of a controlling system for the plant and the electric drive and including hydraulic and electric components; said electric component including an excitation circuit for the electric generator, and means including a rheostat adjustable to interpose resistance in and remove resistance from the excitation circuit; and said hydraulic component comprising means providing a control pressure space, means for maintaining liquid under control pressure in said space and including an adjustable escape valve for varying the control pressure, manually operable means for adjusting the escape valve, means responsive to control pressure for varying the input of fuel to the gas generator, a servo-motor for operating the rheostat and including a relay operable in response to the control pressure, and variable means for controlling the admission of motive fluid to the servo-motor to retard adjustment of the rheostat in relation to the adjustment of fuel input so that, when the input of fuel is increased for increase in propulsion speed, the turbine power increases temporarily in relation to generator load for acceleration of the turbine and compressor to hasten the increase in the quantity of air required for the increased fuel input to avoid excessive rise in temperature of gaseous motive fluid supplied to the turbine.

4. The combination with a gas turbine plant wherein a turbine drives a compressor, wherein fuel is supplied to a gas generator furnished with air from the compressor to support combustion of the fuel and to admix with the products of combustion to form gaseous motive fluid supplied to the turbine, and wherein the turbine drives a generator which energizes one or more motors connected to propelling means; of a controlling system for the plant and the electric drive and including hydraulic and electric components; said electric component including an excitation circuit for the electric generator, and means including a rheostat adjustable to interpose resistance in and remove resistance from the excitation circuit; and said hydraulic component comprising means providing a control pressure space, means for maintaining liquid under control pressure in said space and including an adjustable escape valve for varying the control pressure, manually operable means for adjusting the escape valve, means responsive to control pressure for varying the input of fuel to the gas generator, a servo-motor for operating the rheostat and including a pressure-responsive relay, and manually adjustable means utilizing liquid under control pressure to provide for application to the pressure-responsive relay of liquid under pressure having such ratio to the control pressure that the pressure-responsive relay is operated to cause operation of the servo-motor to adjust the rheostat through its range for the load range of the control pressure.

5. The combination with a gas turbine plant wherein a turbine drives a compressor, wherein fuel is supplied to a gas generator furnished with air from the compressor to support combustion of the fuel and to admix with the products of combustion to form gaseous motive fluid supplied to the turbine, and wherein the turbine drives a generator which energizes one or more motors connected to propelling means; of a controlling system for the plant and the electric drive and including hydraulic and electric components; said electric component including an excitation circuit for the electric generator, and means including a rheostat adjustable to interpose resistance in and remove resistance from the excitation circuit; and said hydraulic component comprising means providing a control pressure space, means for maintaining liquid under control pressure in said space and including an adjustable escape valve for varying the control pressure, means for adjusting the escape valve, pressure-responsive means for varying the input of fuel to the gas generator, manually adjustable means utilizing liquid under control pressure to provide for application to said pressure-responsive means of liquid under pressure having such ratio to the control pressure that the pressure-responsive means is operated to vary the input of fuel over its full range for the load range of the control pressure, a servo-motor for operating the rheostat and including a pressure-responsive relay, and manually adjustable means utilizing liquid under control pressure to provide for application to the pressure-responsive relay of liquid under pressure having such ratio to the control pressure that the pressure-responsive relay is operated to cause operation of the servo-motor to adjust the rheostat for its full range for the load range of the control pressure.

6. The combination with propulsion apparatus wherein a turbine drives a compressor; wherein fuel is supplied through a control valve to a gas generator furnished with air from the compressor to support combustion of the fuel and to admix with the products of combustion to form gaseous motive fluid supplied to the turbine, and wherein the turbine drives a generator which energizes one or more motors connected to propelling means; of a controlling system for the plant and the electric drive and including hydraulic and electric components; said electric component including an excitation circuit for the electric generator, a controller for interposing resistance in and removing resistance from the excitation circuit, and a rheostat for interposing resistance in and removing resistance from the excitation circuit, said controller and rheostat being so arranged that the resistances interposed thereby in the excitation circuit are in series in such circuit; and said hydraulic component comprising means providing a control pressure space, means for maintaining liquid under control pressure in said space and including an adjustable escape valve for varying the control pressure, a manually operable control member for adjusting the escape valve and for operating the controller so that both the input of fuel and the excitation of the generator are increased for increase in propulsion speed, pressure-responsive means for operating the fuel control valve, manually adjustable means utilizing liquid under control pressure to provide for application to said pressure-responsive means of liquid under pressure having such ratio to the control pressure that the pressure-responsive means is operated to move the fuel control valve over its range for the load range of the control pressure, a servo-motor for operating the rheostat and including a pressure-responsive relay, manually adjustable means utilizing liquid under control pressure to provide for application to the pressure-responsive relay of liquid under pressure having such ratio to the control pressure that the pressure-responsive relay is operated to cause operation of the servo-motor to adjust the rheostat for its full range for the load range of the control pressure, and variable means for controlling the admission of motive fluid to the servo-motor to retard adjustment of the rheostat in relation to the fuel control valve so that, when the input of fuel is increased for increase in propulsion speed, the turbine power increases temporarily in relation to electric generator load for acceleration of the turbine and compressor to hasten the increase in the quantity of air required for the increased fuel input to the gas generator to avoid excessive rise in temperature of gaseous motive fluid supplied to the turbine.

7. The combination with propulsion apparatus wherein a turbine drives a compressor, wherein fuel is supplied through a control valve to a gas generator furnished with air from the compressor to support combustion of the fuel and to admix with the products of combustion to form gaseous motive fluid supplied to the turbine, and wherein the turbine drives a generator which energizes one or more motors connected to propelling means; of a controlling system for the plant and the electric drive and including hydraulic and electric components; said electric component including a excitation circuit for the electric generator, a controller for interposing resistance in and removing resistance from the excitation circuit, and a rheostat for interposing resistance in and removing resistance from the excitation circuit, said controller and rheostat being so arranged that the resistances interposed thereby in the excitation circuit are in series in such circuit; and said hydraulic component comprising means providing a control pressure space, means for maintaining liquid under control pressure in said space and including an adjustable escape valve for varying the pressure, a manually operable control member for adjusting the escape valve and for operating the controller, pressure-responsive means for operating the fuel control valve, a centrifugal governor driven by the turbine and operative to provide a governor liquid pressure, manually adjustable means utilizing the higher one of the control and governor pressures to provide for application to the pressure-responsive means of liquid under pressure such that, with the control pressure being utilized, the applied pressure has such ratio to the control pressure that the pressure-responsive means is operated to move the fuel control valve over its range for the load range of the control pressure, pressure-responsive means for varying the relation of governor pressure to turbine speed so that the governor pressure is raised and lowered as the control pressure is raised and lowered, manually adjustable means utilizing liquid under control pressure to provide for application to the last-named pressure-responsive means of liquid under pressure having such ratio to the control pressure that such pressure-responsive means is operated to adjust the speed setting of the governor to keep the governor pressure normally below the control pressure so as to increase in response to increase in turbine speed and supersede the control pressure in control of the fuel control valve to restrict the fuel input and thereby limit the turbine speed, a servo-motor for operating the rheostat and including a pressure-responsive relay, manually adjustable means utilizing liquid under control pressure to provide for application to the relay of liquid under pressure having such ratio to the control pressure that the relay is operated to cause the servo-motor to adjust the rheostat over its range for the full range of control pressure, and variable means for controlling the admission of motive fluid to the servo-motor to retard adjustment of the rheostat in relation to the fuel control valve so that, when the input of fuel to the gas generator is increased for increase in propulsion speed, the turbine power increases temporarily in relation to generator load for acceleration of the turbine and compressor to hasten the increase in the quantity of air required for the increased fuel input to avoid excessive rise in temperature of gaseous motive fluid supplied to the turbine.

8. In a propulsion gas turbine plant wherein a turbine drives a compressor, wherein fuel is supplied through a control valve to a gas generator furnished with air from the compressor to support combustion of the fuel and to admix with the products of combustion to form gaseous motive fluid supplied to the turbine, and wherein the turbine drives a generator which energizes one or more propulsion motors: of a controlling system for the plant and the electric drive and including hydraulic and electric components and first and second manual control members for controlling the components; said electric component including an excitation circuit for the generator, a reversing switch for the excitation circuit and operatively connected to the first manual control member, a controller operatively connected to the second manual control member and being operative to interpose resistance in and remove resistance from the excitation circuit, and a rheostat operative to interpose resistance in and to remove resistance from the excitation circuit, said controller and the rheostat being so arranged that the resistance of the controller and of the rheostat are in series in the excitation circuit, and said hydraulic component comprising means providing a control pressure space, a pump, means including a conduit and orifice for supplying liquid from the pump to the control pressure space, a stop valve for opening and closing the conduit and operatively connected to the first manual control member, an escape valve for the control pressure space and presenting an area for exposure to control pressure so that the latter is effective to apply opening force thereto, a spring for exerting closing force on the escape valve, means for varying the loading of the spring and operatively connected to the second manual control member, pressure-responsive means for operating said fuel control valve, means utilizing oil supplied under control pressure from the control pressure space to provide for application to the pressure-responsive means of oil under pressure in such ratio to the control pressure that the pressure-responsive means is operated to move the fuel control valve over its range for the load range of the control pressure, a servo-motor for operating the rheostat and including a pressure-responsive relay, means utilizing liquid supplied under control pressure from said control pressure space to provide for application to the pressure-responsive relay of liquid under pressure in such ratio to the control pressure that the relay is controlled for actuation of the servo-motor for operation of the rheostat for its full range for the load range of the control pressure, and variable means for restricting the admission of motive fluid to the servo-motor to retard adjustment of the rheostat in relation to the fuel control valve so that, when the input of fuel is increased for increase in propulsion speed, the turbine power increases temporarily in relation to the generator load for acceleration of the turbine and compressor to hasten the increase in the quantity of air required for the increase in fuel input to avoid excessive rise in temperature of gaseous motive fluid supplied to the turbine.

9. In a propulsion gas turbine plant wherein a turbine drives a compressor, wherein fuel is supplied through a control valve to a gas generator and air is furnished to the latter from the compressor, through a passage having a normally-closed atmospheric vent valve, to support combustion of the fuel and to admix with the products of combustion to form gaseous motive fluid supplied to the turbine, and wherein the turbine drives a generator which energizes one or more propulsion motors: of a controlling system for the plant and the electric drive and including hydraulic and electric components and first and second manual control members for controlling the components; said electric component including an excitation circuit for the generator, a reversing switch for the excitation circuit and operatively connected to the first manual control member, a controller operatively connected to the second manual control member and being operative to interpose resistance in and remove resistance from the excitation circuit, and a rheostat operative to interpose resistance in and to remove resistance from the excitation circuit, said controller and the rheostat being so arranged that the resistances of the controller and of the rheostat are in series in the excitation circuit; said hydraulic component comprising means providing a control pressure space, means providing a governor pressure space, means providing an emergency governor space, a pump, means including a pair of conduits and orifices for supplying liquid from the pump to the control pressure space, a stop valve for opening and closing the conduit and operatively connected to said first manual control member, an escape valve for the control pressure space and presenting an area for exposure to control pressure so that the latter is effective to apply opening force thereto, a spring for exerting closing force on the escape valve, means for varying the loading of the spring and operatively connected to the second manual control member, means including an orifice for supplying liquid from the pump to the governor pressure space, a centrifugal governor driven from the turbine, an escape valve for the governor pressure space and operated by the governor to provide governor pressure in the space, pressure-responsive means for operating the fuel control valve, manually adjustable means utilizing the higher one of the control and governor pressures to provide for application to the pressure-responsive means of liquid under pressure such that, with the control pressure being utilized, the applied pressure has such ratio to the control pressure that the fuel control valve may be moved through its full range for the load range of the control pressure, a servo-motor for operating the rheostat and including a pressure-responsive relay, means utilizing liquid supplied under control pressure from said control pressure space to provide for application to the pressure-responsive relay of liquid under pressure in such ratio to the control pressure that the relay is controlled for actuation of the servo-motor for operation of the rheostat for its full range for the load range of the control pressure, variable means for restricting the admission of motive fluid to the servo-motor to retard adjustment of the rheostat in relation to the fuel control valve so that, when the input of fuel is increased for increase in propulsion speed, the turbine power increases temporarily in relation to generator load for acceleration of the turbine and compressor to hasten the increase in the quantity of air required for the increase in fuel input to avoid excessive rise in temperature of gaseous motive fluid supplied to the turbine, means including a conduit connected to said conduit between the stop valve thereof and the orifice and including an orifice for supplying liquid to the emergency governor space, a trip valve normally latched closed to maintain pressure in the emergency governor space, means responsive to pressure in the emergency governor space to hold the vent valve closed and to release of such pressure incident to opening of the trip valve to close the fuel control valve and open the vent valve, and an emergency governor responsive to a predetermined overspeed of the turbine to unlatch the trip valve to release the pressure in the emergency governor space.

10. Apparatus as claimed in claim 9 with a speed changer for the governor, means including a pressure-responsive device for adjusting the speed changer, and manually adjustable means utilizing liquid under control pressure to provide for application to the pressure-responsive device of liquid whose pressure has such ratio to the control pressure that the governor operates to maintain a governor pressure slightly lower than the control pressure over the load range of the latter and is effective to increase the governor pressure above the control pressure to limit the turbine speed.

ANTHONY F. SCHWENDNER.

REFERENCES CITED

The following references are of record in the file of this patent:

UNITED STATES PATENTS

| Number | Name | Date |
|---|---|---|
| 1,978,837 | Forsling | Oct. 30, 1934 |
| 1,981,618 | Faverty | Nov. 20, 1934 |
| 2,053,061 | Bristol | Sept. 1, 1936 |
| 2,193,114 | Seippel | Mar. 12, 1940 |
| 2,263,705 | Seippel | Nov. 25, 1941 |
| 2,339,185 | Nettel | Jan. 11, 1944 |